(12) United States Patent
Wuebbeling et al.

(10) Patent No.: US 11,148,088 B2
(45) Date of Patent: *Oct. 19, 2021

(54) FILTER ELEMENT WITH AN OBLIQUE SEALING PLANE

(71) Applicant: MANN+HUMMEL GmbH, Ludwigsburg (DE)

(72) Inventors: Martin Wuebbeling, Mannheim (DE); Duc Cuong Nguyen, Laatzen (DE); Beate Brandt, Altlussheim (DE); Karlheinz Muenkel, Oberderdingen-Flehingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,083

(22) Filed: Feb. 10, 2020

(65) Prior Publication Data

US 2020/0254373 A1 Aug. 13, 2020

Related U.S. Application Data

(63) Continuation of application No. 15/443,123, filed on Feb. 27, 2017, now Pat. No. 10,583,383, which is a (Continued)

(30) Foreign Application Priority Data

Aug. 27, 2014 (DE) .................. 102014012490.8

(51) Int. Cl.
*B01D 46/00* (2006.01)
*B01D 46/52* (2006.01)
*B01D 46/10* (2006.01)

(52) U.S. Cl.
CPC ......... *B01D 46/0006* (2013.01); *B01D 46/10* (2013.01); *B01D 46/521* (2013.01);
(Continued)

(58) Field of Classification Search
CPC .......... B01D 46/0006; B01D 2271/022; B01D 46/521; B01D 46/525; B01D 46/526; B01D 46/527; B01D 2279/60
See application file for complete search history.

(56) References Cited

U.S. PATENT DOCUMENTS

| | | | |
|---|---|---|---|
| 7,736,410 B2 * | 6/2010 | Kuempel | B01D 46/008 55/481 |
| 2004/0020177 A1 * | 2/2004 | Ota | B01D 46/10 55/481 |
| 2008/0307759 A1 * | 12/2008 | Reichter | B01D 46/0005 55/428 |

FOREIGN PATENT DOCUMENTS

JP         11132117 A  *  5/1999 ......... B01D 46/0006

* cited by examiner

*Primary Examiner* — Robert Clemente
(74) *Attorney, Agent, or Firm* — James Hasselbeck

(57) ABSTRACT

A filter element for a filter for filtration of a fluid is insertable along an insertion direction into the filter. The filter element is provided with a filter medium to be flowed through along a main flow direction. The filter element has a clean side and a raw side. A sealing surface surrounds the filter medium, wherein the sealing surface, interacting with a filter housing of the filter when the filter element is in an installed state in the filter housing, separates the clean side from the raw side. A support edge exerts a force on the sealing surface by interacting with the filter housing of the filter when the filter element is in the installed state in the filter housing. The sealing surface and the support edge are positioned at an acute angle relative to each other.

14 Claims, 12 Drawing Sheets

Related U.S. Application Data continuation of application No. PCT/EP2015/063529, filed on Jun. 17, 2015.

(52) U.S. Cl.
CPC ...... *B01D 46/525* (2013.01); *B01D 2271/022* (2013.01); *B01D 2279/60* (2013.01)

FILTER ELEMENT WITH AN OBLIQUE SEALING PLANE

CROSS-REFERENCE TO RELATED APPLICATIONS

This application is a continuation application of U.S. application Ser. No. 15/443,123 filed 27 Feb. 2017, which is a continuation application of international application No. PCT/EP2015/063529 having an international filing date of 17 Jun. 2015 and designating the United States, the present application and the international application claiming a priority date of 27 Aug. 2014, based on prior filed German patent application No. 10 2014 012 490.8, the entire contents of the aforesaid US application, the international application and the aforesaid German patent application being incorporated herein by reference to the fullest extent permitted by the law.

BACKGROUND OF THE INVENTION

The following invention concerns a filter, in particular for internal combustion engines, for filtration of a fluid, in particular of air, in particular the intake air of internal combustion engines.

The engine air filtration increasingly gains importance, in particular in construction and agricultural machines. Higher engine performances and stricter emissions regulations require an increased air throughput through the engine. This requires more powerful air filters. The performance of an air filter is characterized by the flow resistance and the service life determined by the filter capacity. With regard to both parameters, a large-size filter element is superior compared to a smaller filter element. However, in case of larger filter elements problems may occur: due to the higher own weight, in particular in partially or completely loaded state, sealing problems may occur, in particular in case of great accelerations of the filter element. These great accelerations can be triggered, for example, by vibrations that are transmitted from the vehicle to the filter element.

It is an object of the invention to provide a filter and a filter element for a filter, in particular for internal combustion engines, for filtration of a fluid, in particular of air, that enables a high sealing effect between filter element and filter housing, in particular for a high own weight of the filter element.

SUMMARY OF THE INVENTION

This object is solved by a filter element for a filter, in particular for internal combustion engines, for filtration of a fluid, in particular of air, as well as by a corresponding filter in accordance with the independent claims. Further embodiments of the invention are disclosed in the dependent claims, the description, and the Figs.

The filter element according to the invention is insertable along an insertion direction into a filter. The filter element comprises a filter medium which can be flowed through along a main flow direction. The filter element comprises a clean side and a raw side. Moreover, the filter element comprises a sealing surface that is surrounding the filter element. The sealing surface separates the clean side from the raw side, in particular when the sealing surface interacts with a filter housing of a filter in an installed state of the filter element. According to the invention, the filter element comprises a support edge or support surface which when interacting with a filter housing of a filter in an installed state of the filter element exerts a force on the sealing surface of the filter element along the main flow direction, wherein the sealing surface and the support edge are positioned at an acute angle relative to each other. The force on the sealing surface can be exerted preferably in the main flow direction X.

Sealing surface is to be understood in the present case as a surface on the filter element that serves for fluid-tight sealing. The sealing surface can be part of a seal. The seal can be, for example, part of the filter element or the sealing surface serves only as a contact surface for a seal that is arranged, for example, on a filter housing. However, an insertion of the filter element into a filter housing along an insertion direction must be possible, wherein the sealing surface is brought into contact at a filter housing such that a sealing effect is generated between filter housing and filter element along the sealing surface.

Instead of an additional housing element, for example, a drawer, a housing cover or a support element that usually serves for pressure application and fixation of a filter element, the present invention provides a sealing surface support edge arrangement which is integrated into the filter element. This measure reduces the necessary components and ensures at the same time a reliable contacting of the sealing surface.

In order to achieve the required great sealing effect along the sealing surface of the filter element, a sufficient force must be exerted on the sealing surface. According to the present invention, it is applied in that the filter element is inserted along an insertion direction into a filter. In the installed state, a force is exerted on the filter element along the insertion direction and is also transmitted to the sealing surface by the geometry of the filter housing receiving the filter element. The closer the filter element gets to its installed state, the stronger a seal, which is located on the sealing surface or is contacting the sealing surface, is compressed by this force. The strength and orientation of the force on the sealing surface is determined decisively by the angle at which the support edge and the sealing surface are positioned relative to each other. The acute angular arrangement of sealing surface and support edge provides an optimization between two goals. On the one hand, an effective conversion of a force which is exerted on the filter element in the insertion direction into a force which is acting on the sealing surface is desired. This is achieved by an angle between sealing surface and support edge that is as small as possible. On the other hand, a displacement of the filter element along the sealing surface relative to a filter housing occurring in this context is to be minimized. Such a displacement causes the force exerted on a seal to increase so that an increasing shearing load is acting on the seal. Such a displacement is minimized by an angle as large as possible. As a result, a compromise must be found between a force exerted on the sealing surface and the displacement travel which is traveled due to this force. The invention provides therefore that an acute angle between the sealing surface and the support edge enables an optimization of this compromise and accordingly a significantly greater sealing force can be exerted on a seal before the maximum shearing force is surpassed.

For the present invention it has moreover been found that a certain angle range between sealing surface and support edge can provide a decisive contribution to optimization. In particular, it is advantageous when sealing surface and support edge are positioned at an angle that is greater or identical to 20° and smaller or identical to 30°, and particularly at an angle of 22°±2°, relative to each other.

These results are the result of an in-depth consideration of the force transfer from filter element to the sealing surface. When an equilibrium of forces is determined with consideration of the angle ratios, the friction coefficients, and the force exerted on the filter element, it follows $$F_Z = F_D\left(\mu_D\cos(\alpha) + \sin(\alpha) + (\mu_D\sin(\alpha) + \cos(\alpha))\frac{\sin(\beta) + \mu K\cos(\beta)}{\cos(\beta) - \mu K\sin(\beta)}\right)$$

wherein $F_Z$ is the clamping force exerted on the filter element in the installed state in particular by a housing cover, $F_D$ the force which is maximally exertable on a seal arranged on the sealing surface, $\mu_D$ the friction coefficient between seal and a filter housing, $\mu_K$ the friction coefficient between the support edge and a filter housing, $\alpha$ the angle between the insertion direction and the sealing surface, and $\beta$ the angle between the insertion direction and the support edge.

For an optimization with regard to the angles $\alpha$ and $\beta$, the equation was simplified by means of the small-angle approximation $$\sin(x)=x$$

$$\cos(x)=1$$

to $$F_Z = F_D(\mu_D + \alpha) + \frac{F_D(\alpha\mu_D + 1)(\delta\beta + \mu_K)}{1 - \delta\beta\mu_K}$$

and resolved for angle $\beta$ $$\beta = \bar{\delta}\frac{-\alpha + \frac{F_Z}{F_D} - \mu_D - \mu_K - \alpha\mu_D\mu_K}{1 + \alpha\mu_D - \alpha\mu_K + \frac{F_Z}{F_D}\mu_K - \mu_D\mu_K}$$

wherein $\bar{\delta}=1/\delta$.

Contrary to the expectations, the small-angle approximation provides good approximation values even up to a range of 30°. The results can be even more improved by introducing a correction factor $\delta=1.0 \ldots 1.2$; this has been proven by an empirical test. The afore mentioned angle range of 20° ... 30° has been determined as a surprising result of a multi-parameter optimization of this equation. The resulting dependencies $\beta(F_Z, F_D)$, $\beta(\mu_D, \mu_K)$ for the established parameter ranges have been evaluated. In this context, it was surprisingly found that within the parameter ranges that are usually applied for $F_Z$, $F_D$, $\mu_D$, and $\mu_K$, in particular for constant $\alpha=0$, a narrow angle range of 20° ... 30° fulfills all boundary conditions. This can be taken from the following table.

| $F_Z$/N | $\beta(F_Z)$ | $F_D$/N | $\beta(F_D)$ | $\mu_D$ | $\beta(\mu_D)$ | $\mu_K$ | $\beta(\mu_K)$ |
|---|---|---|---|---|---|---|---|
| 200 | −34.60 | 100 | 84.64 | 1.00 | 52.98 | 0.00 | 30.51 |
| 220 | −28.08 | 105 | 78.49 | 1.05 | 51.10 | 0.01 | 29.83 |
| 240 | −21.73 | 110 | 72.72 | 1.10 | 49.19 | 0.02 | 29.16 |
| 260 | −15.55 | 115 | 67.29 | 1.15 | 47.27 | 0.03 | 28.50 |
| 280 | −9.54 | 120 | 62.17 | 1.20 | 45.33 | 0.04 | 27.85 |
| 300 | −3.67 | 125 | 57.33 | 1.25 | 43.36 | 0.05 | 27.21 |
| 320 | 2.04 | 130 | 52.76 | 1.30 | 41.38 | 0.06 | 26.57 |
| 340 | 7.61 | 135 | 48.42 | 1.35 | 39.38 | 0.07 | 25.95 |
| 360 | 13.04 | 140 | 44.32 | 1.40 | 37.36 | 0.08 | 25.33 |
| 380 | 18.34 | 145 | 40.41 | 1.45 | 35.32 | 0.09 | 24.71 |
| 400 | 23.51 | 150 | 36.70 | 1.50 | 33.26 | 0.10 | 24.11 |
| 420 | 28.55 | 155 | 33.17 | 1.55 | 31.18 | 0.11 | 23.51 |
| 440 | 33.48 | 160 | 29.80 | 1.60 | 29.08 | 0.12 | 22.92 |
| 460 | 38.29 | 165 | 26.58 | 1.65 | 26.95 | 0.13 | 22.33 |
| 480 | 42.99 | 170 | 23.51 | 1.73 | 23.51 | 0.14 | 21.75 |
| 500 | 47.59 | 175 | 20.57 | 1.75 | 22.64 | 0.15 | 21.18 |
| 520 | 52.07 | 180 | 17.76 | 1.80 | 20.45 | 0.16 | 20.62 |
| 540 | 56.46 | 185 | 15.06 | 1.85 | 18.23 | 0.17 | 20.06 |
| 560 | 60.76 | 190 | 12.48 | 1.90 | 16.00 | 0.18 | 19.50 |

For the calculation, the correction factor $\delta$ based on empirically determined data was selected as 1.17. Based on the comparatively narrow angle corridor which is provided by the dependency $\beta(\mu_K)$ in the context of the usual parameter ranges, gradually the remaining angle ranges which result from the other dependencies within the context of the usual parameter ranges have been evaluated with respect to this corridor. Surprisingly, it was found that the angle corridor of 20°-30° can be fulfilled for all dependencies. The ranges which have been excluded in the context of evaluation or whose values are invalid, for example, a negative angle $\beta$, are indicated in italics. Moreover, it was found that, despite the relatively great difference in the friction coefficients at the sealing surface and at the support edge, the optimal angle sum $\alpha+\beta$ is almost constant for different values for the angle $\alpha$. This is illustrated in an exemplary fashion in the following table for the data set $F_Z=400$ N, $F_D=170$ N, $\mu_D=1.73$, and $\mu_K=0.11$.

| $\alpha$ | $\beta(\alpha)$ | $\alpha + \beta$ |
|---|---|---|
| 0.00 | 23.51 | 23.51 |
| 1.00 | 21.97 | 22.97 |
| 2.00 | 20.52 | 22.52 |
| 3.00 | 19.13 | 22.13 |
| 4.00 | 17.81 | 21.81 |
| 5.00 | 16.56 | 21.56 |
| 6.00 | 15.36 | 21.36 |
| 7.00 | 14.21 | 21.21 |
| 8.00 | 13.12 | 21.12 |
| 9.00 | 12.07 | 21.07 |
| 10.00 | 11.06 | 21.06 |
| 11.00 | 10.10 | 21.10 |
| 12.00 | 9.17 | 21.17 |
| 13.00 | 8.28 | 21.28 |
| 14.00 | 7.43 | 21.43 |
| 15.00 | 6.60 | 21.60 |
| 16.00 | 5.81 | 21.81 |
| 17.00 | 5.05 | 22.05 |
| 18.00 | 4.32 | 22.32 |

It is thus possible in accordance with the invention to optimize within the claimed angle range, substantially independent of the angle $\alpha$ between the sealing surface and the insertion direction, the geometry of the filter element. For example, the relative displacement travel can be optimized. For a smaller angle $\alpha+\beta$, a longer displacement travel results; for a greater angle $\alpha+\beta$ greater mounting forces are produced. This results from a consideration of the displacement travel r of the sealing surface relative to the housing, as illustrated in the following in an exemplary fashion for the angle range 0° ... 27.5°. It can be seen that values for the displacement travel r of 12 mm or less, which can be viewed as acceptable, occur first in the range of α+β>18.5°.

| α + β | r/mm |
|---|---|
| 0.50 | 458.37 |
| 2.00 | 114.61 |
| 3.50 | 65.52 |
| 5.00 | 45.89 |
| 6.50 | 35.33 |
| 8.00 | 28.74 |
| 9.50 | 24.24 |
| 11.00 | 20.96 |
| 12.50 | 18.48 |
| 14.00 | 16.53 |
| 15.50 | 14.97 |
| 17.00 | 13.68 |
| 18.50 | 12.61 |
| 20.00 | 11.70 |
| 21.50 | 10.91 |
| 23.00 | 10.24 |
| 24.50 | 9.65 |
| 26.00 | 9.12 |
| 27.50 | 8.66 |

Based on this consideration, the value of 20° to 26°, preferably 22°±2°, has been found to be a particularly preferred angle (α+β).

A further embodiment provides that the support edge is arranged laterally, above or below outside of the flow-through area of the filter element. Accordingly, no reduction of the effective cross section of the flow-through surface of the filter element takes place. At the same time, a good application of the force on the sealing surface is possible.

A further advantageous embodiment of the invention provides that the filter medium comprises an inflow surface and an outflow surface wherein the outflow surface is arranged in the main flow direction at least partially downstream of the sealing surface. At least part of the outflow surface projects past the sealing surface already for minimal tilting of the sealing surface relative to the insertion direction. This provides for an advantageous utilization of the available installation space.

According to the invention, it can be provided that the support edge is part of a support structure wherein the support structure has an elongate extension in the insertion direction. Alternatively or additionally, the support structure can also be V-shaped and can end in a blunt tip. Support edge and sealing surface therefore do not meet. Advantageously, the support structure tapers in insertion direction. The elongate extension of the support structure in the insertion direction ensures a reliable contact pressure of the sealing surface against the filter housing across the entire extension of the filter element in the insertion direction. The V-shape forms the acute angle between sealing surface and support edge. In this context, a blunt tip is to be understood in the present case as a rounded portion or a straight cut-off of the smallest spacing of the sealing surface and the support edge.

Preferably, it is provided that the support structure is of a two-part configuration. A first support structure is located on one side of the main flow direction, a second support structure is located opposite the first support structure on the other side of the main flow direction. Accordingly, on both sides of the filter element a uniform contact pressure of the sealing surface is provided. Alternatively or additionally, a third and/or fourth support structure or support area below and/or above the main flow direction can be provided that enables contact pressure of the sealing surface also below.

A further advantageous embodiment of the invention provides that the sealing surface is part of the support structure wherein in particular a projection of the support edge in the main flow direction will come to rest on the sealing surface. It is thus ensured that the support edge in the main flow direction can transmit a force to the sealing surface and the force thus can be introduced perpendicularly into the sealing surface.

In an embodiment it is provided that the filter medium is a folded filter medium or/and parallelepipedal. The folding of the filter medium in particular in parallelepipedal shape is particularly advantageous for large filter elements.

The advantages of the present invention are important in particular in embodiments in which the filter element in the unloaded state weighs more than 2 kg or/and in the loaded state more than 4 kg. In particular in case of filter elements with high own weight, the aforementioned sealing problems occur and can thus be solved or mitigated by means of the invention.

The inventive concept is also used in a filter for filtering a fluid wherein the filter comprises a filter housing for receiving a filter element along an insertion direction. The filter housing can be flowed through along a main flow direction and comprises a clean side, a raw side, and a housing sealing surface which, by interacting with a filter element, separates the clean side from the raw side in an installed state of the filter element. Moreover, the filter housing comprises a support edge which, when interacting with a filter element, exerts a force on the filter element along the main flow direction in an installed state of the filter element, wherein housing sealing surface and guiding surface are positioned at an acute angle relative to each other. Accordingly, the force which is exerted on the filter element in the installed state is transmitted by the guiding surface to the support edge and thus also to the oppositely positioned sealing surface.

An embodiment of the filter according to the invention provides that the guiding surface and the housing sealing surface are positioned at an angle 20° and 30° and in particular an angle of 22°±2° relative to each other.

According to the invention in an embodiment of the filter a filter element clamping device is provided which, in the installed state of the filter element, exerts a force on the filter element in the direction of the insertion direction. The filter element clamping device applies thus to the filter element a force which is transmitted by support edge and sealing surface to the filter housing.

BRIEF DESCRIPTION OF THE DRAWINGS

The invention will be explained in more detail with reference to the drawings.

DESCRIPTION OF PREFERRED EMBODIMENTS

Figure 1:
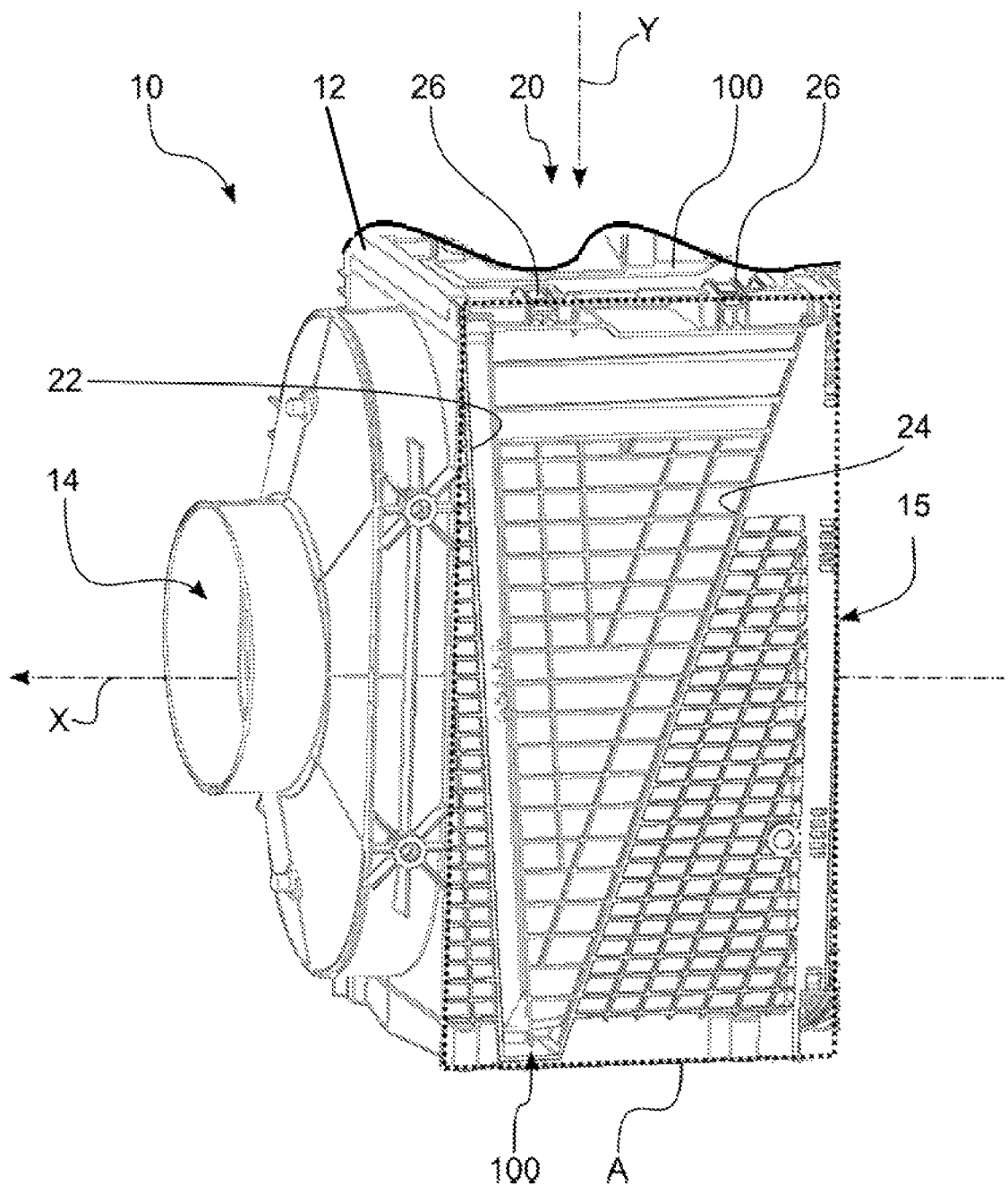
FIG. 1 is a perspective cutaway illustration of the filter according to the invention.
Figure 2:
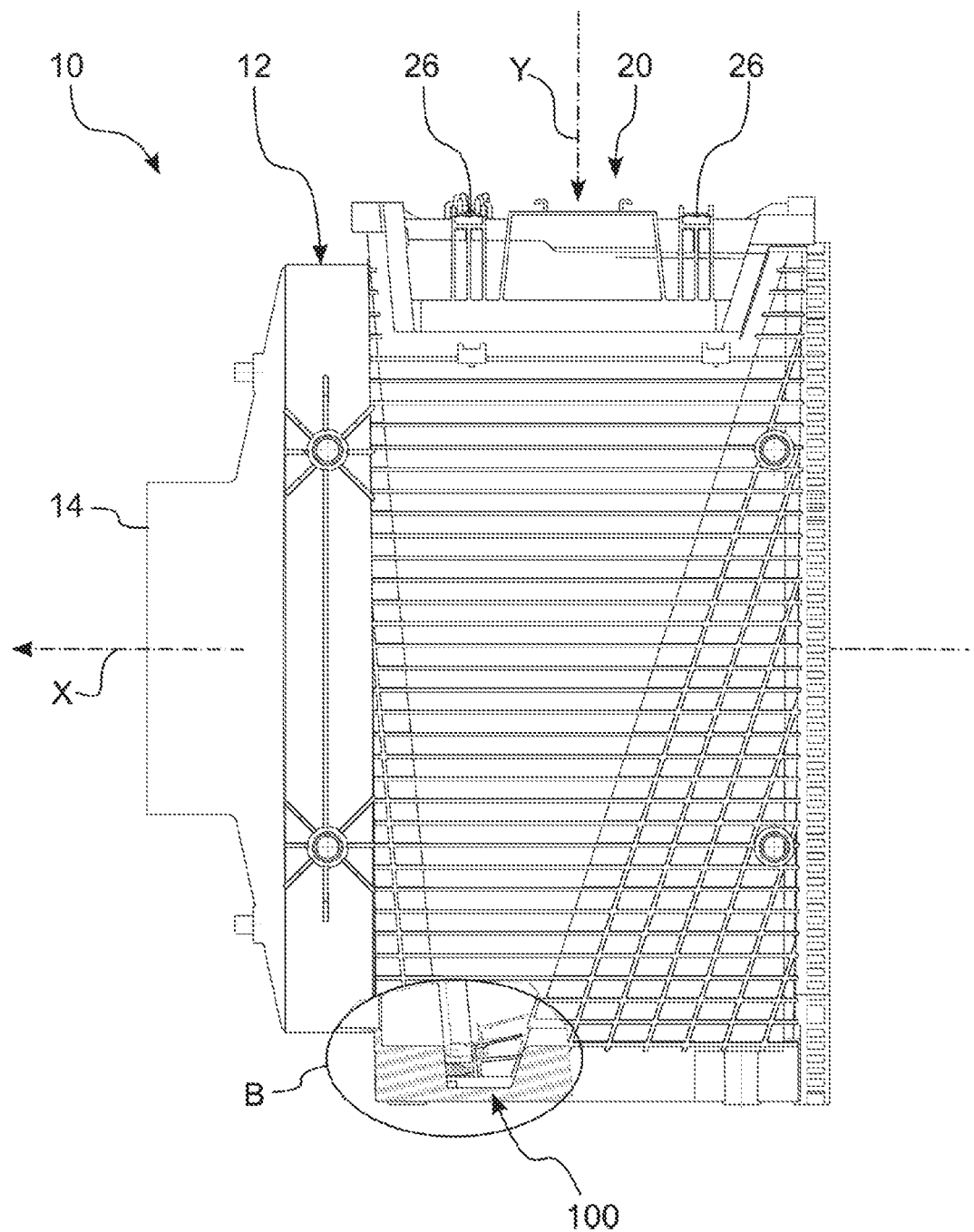
FIG. 2 is a lateral cutaway illustration of the filter according to the invention.
Figure 3:
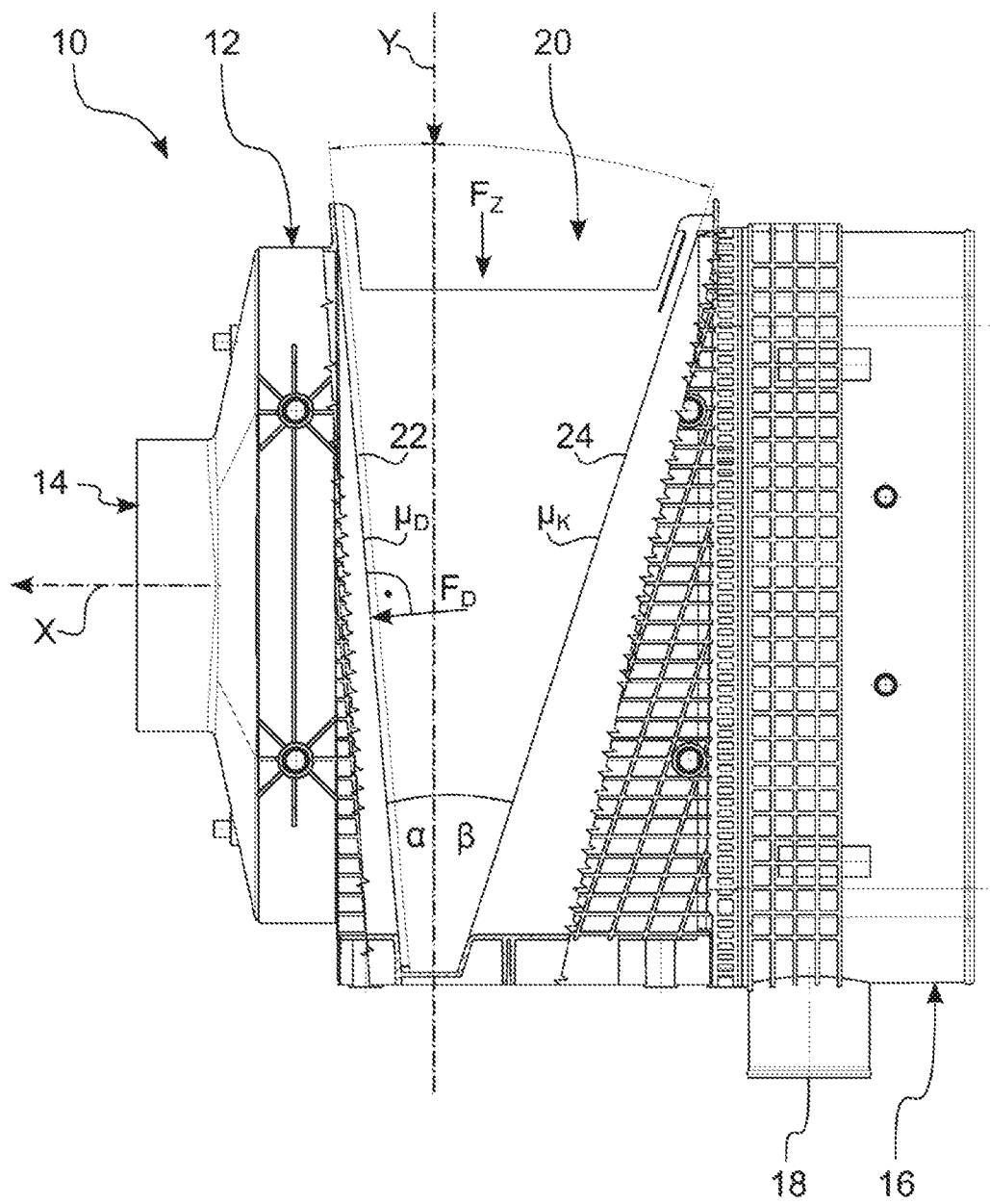
FIG. 3 is a further lateral cutaway illustration of the filter according to the invention.

The FIGS. 1 to 3 shows schematic illustrations of a filter 10 according to the invention. The filter 10 comprises a filter housing 12 which can be flowed through along a main flow direction X. In FIG. 1, the part of the filter housing 12 which is facing the onlooker is omitted within the dashed-line frame A in order to illustrate the arrangement of a filter element 100 disposed therein. In FIG. 2, especially in a cutaway illustrated area B the arrangement of a filter element 100 in two different insertion positions is illustrated. In FIG. 3, the filter housing is also shown in a cutaway illustration; however, in contrast to FIG. 1, no filter element 100 is arranged in the filter housing 12.

In FIGS. 1 to 3, an outflow opening 14 is shown in the filter housing 12. The inflow opening 15 is located opposite to the main flow direction X on the opposite end of the housing 12. In FIG. 3, upstream of the inflow opening a cyclone block 16 is arranged which can be provided in an alternative embodiment to that of FIGS. 1 and 2. The cyclone block 16 comprises a coarse separation opening 18 through which liquid or solid materials which have been preseparated in the cyclone block 16 can be removed from the housing 12. The coarse separation opening 18 can be arranged in the insertion direction Y downward or laterally perpendicular to the insertion direction Y for a lateral assembly of the filter 10. For an overhead assembly with insertion opening 20 that is accessible from below, the coarse separation opening 18 can be arranged accordingly at the top in the drawing, i.e., adjacent to the coarse separation opening 18.

The filter housing 12 comprises in FIGS. 1 to 3 at the top side an insertion opening 20 through which the filter element 100 can be inserted into the filter 10. A filter element is to be understood in this context as a filter element that can be exchangeably arranged in a filter housing. Such an element is also referred to as filter insert. The filter element 100 comprises in this preferred embodiment a substantially parallelepipedal geometry with a long edge 112 and a short edge 114. The filter element is inserted along the long edge 112 into the filter housing 12; the insertion opening 20 is then located on the short edge 114 of the filter element. The geometry of the insertion opening 20 defines an insertion direction Y which is substantially perpendicular to the main flow direction X. Depending on the inner geometry of the filter housing 12 and the corresponding geometry of the filter element 100, the angle between the insertion direction Y and the main flow direction X can be different from 90° in an angle range between 80 and 100°. Upon insertion of the filter element 100 into the filter housing 12, a filter element 100 comes into contact inter alia with a housing sealing surface 22 and a guiding surface 24. Preferably, the seal is mounted on the filter element 100 and the housing sealing surface 22 serves as a contact surface for the seal of the filter element 100. The guiding surface 24 can be a housing step in the filter housing 12. In this context, the filter element 100 can contact the edge of such a step or the surface of such a step. The guiding surface 24 must not necessarily be designed to be continuous. It can be interrupted in sections or can be comprised only of individual guiding surface sections.

Housing sealing surface 22 and guiding surface 24 form a V-shaped geometry. This arrangement is particularly well illustrated in FIG. 3. In the present embodiment, the housing sealing surface 22 as well as the guiding surface 24 are positioned at an angle relative to the insertion direction Y. The angle between the housing sealing surface 22 and the insertion direction Y is identified by $\alpha$, the angle between the guiding surface 24 and the insertion direction Y by $\beta$. Housing sealing surface 22 and guiding surface 24 to not meet each other directly within the filter housing 12. Instead, the V-shaped geometry is provided with a blunt tip.

In determining the equation recited in the general description, the friction coefficient between filter housing 12 and a seal resting against it has been identified by $\mu_D$, the friction coefficient between the filter housing 12 and an edge of a filter element 100 disposed therein by $\mu_K$. $F_D$ refers to the force which is exerted on the housing sealing surface 22 or the seal resting against it. $F_D$ is assumed to be acting perpendicularly on the housing sealing surface 22. These correlations are explicitly shown in FIG. 3.

As can be seen in FIGS. 1 and 2, the filter housing 12 moreover comprises a filter element clamping device 26 in the form of several clamping closures or clamping closure bearings arranged in the area of the insertion opening 20. By means of the filter element clamping device 26, a force $F_Z$ is applied to a filter element 100 disposed in the filter housing 12. This clamping force $F_Z$ is illustrated in FIG. 3.

In FIG. 2 in the cutaway section B the insertion process of the filter element 100 is illustrated. However, first the configuration of the filter element 100 will be explained with the aid of FIGS. 4 and 5 before the cutaway section A and the illustrated insertion process are explained in more detail.

Figure 4:
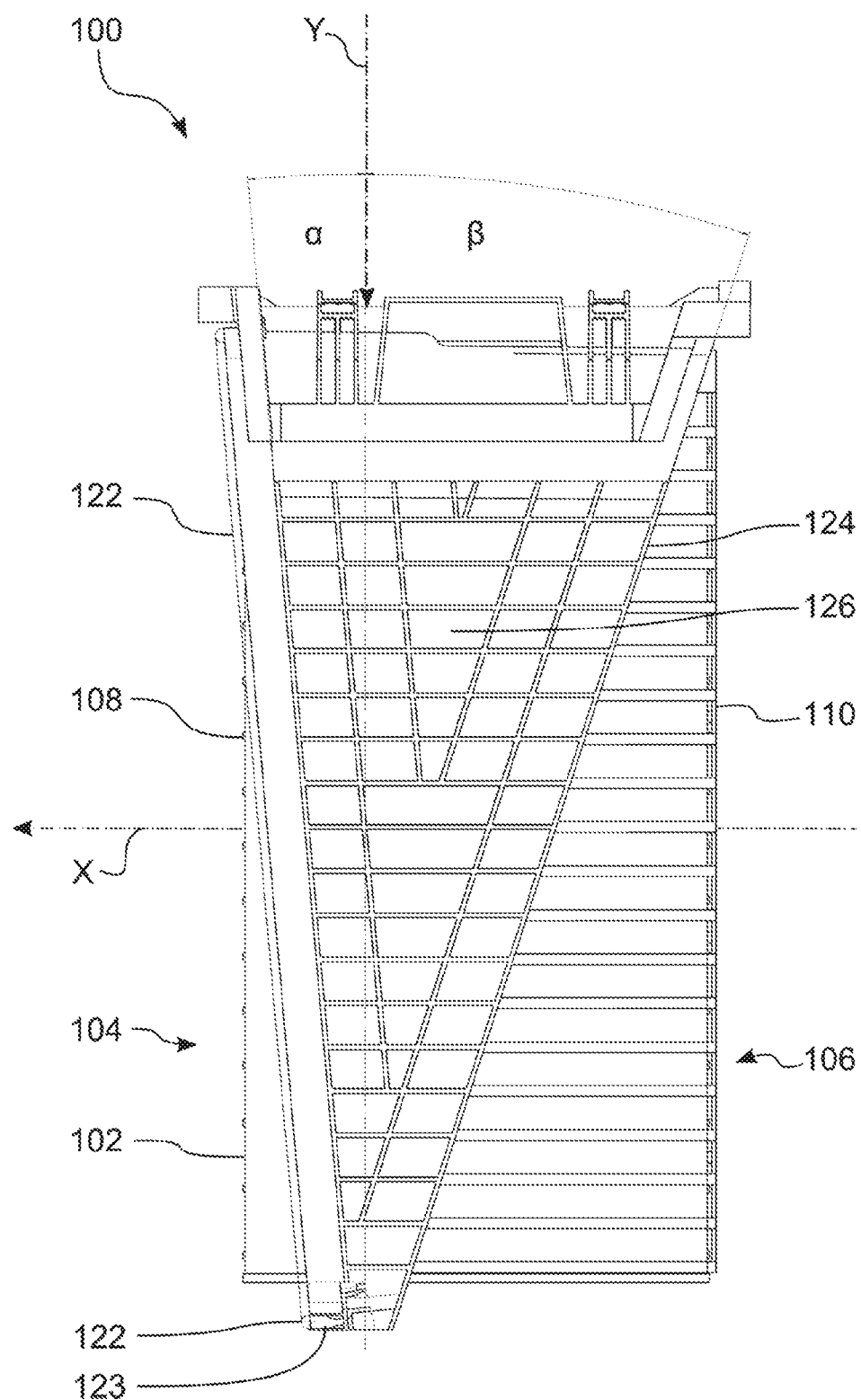
FIG. 4 is a first lateral illustration of a filter element according to the invention.
Figure 5:
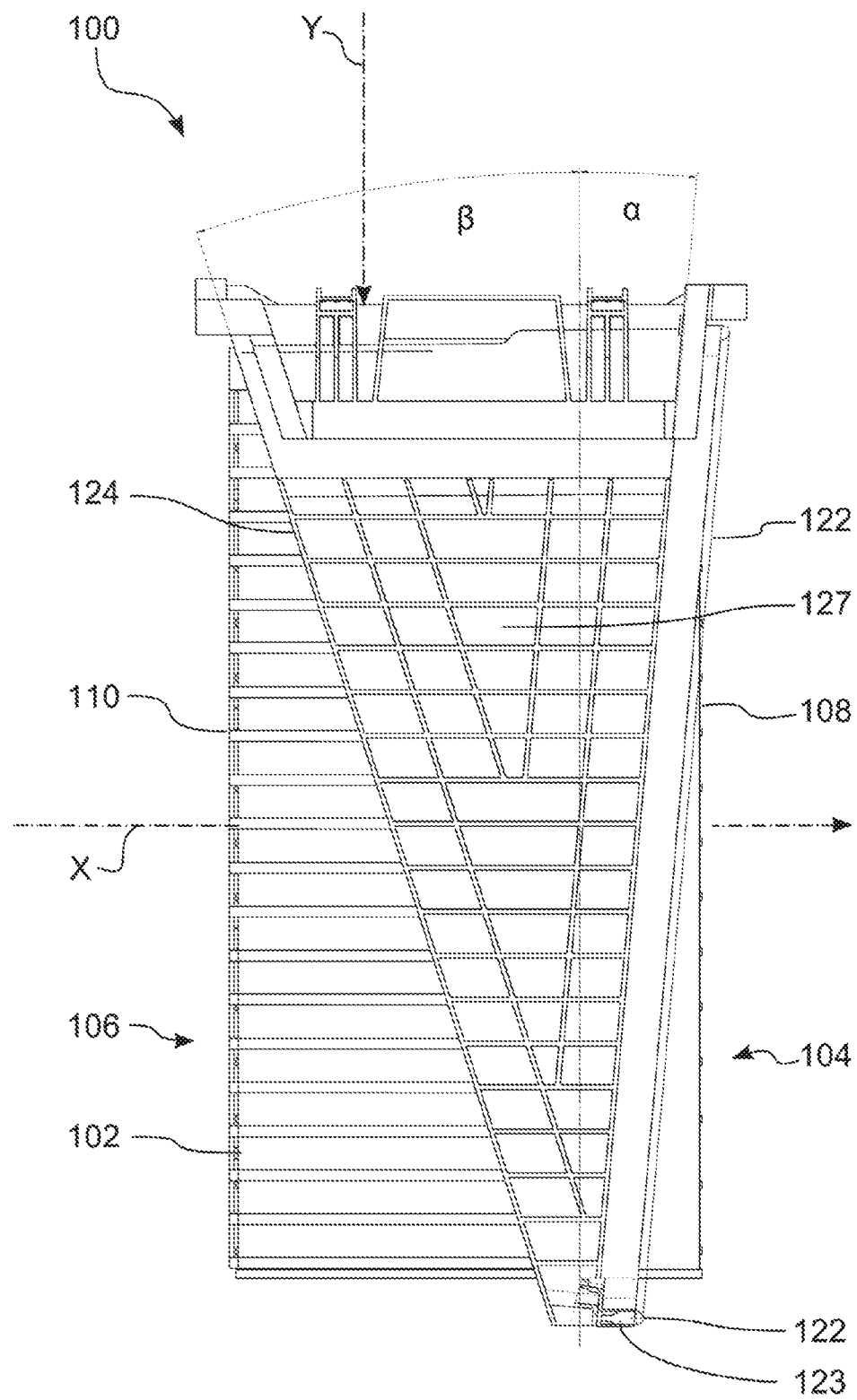
FIG. 5 is a second lateral illustration of a filter element according to the invention.
Figure 6:
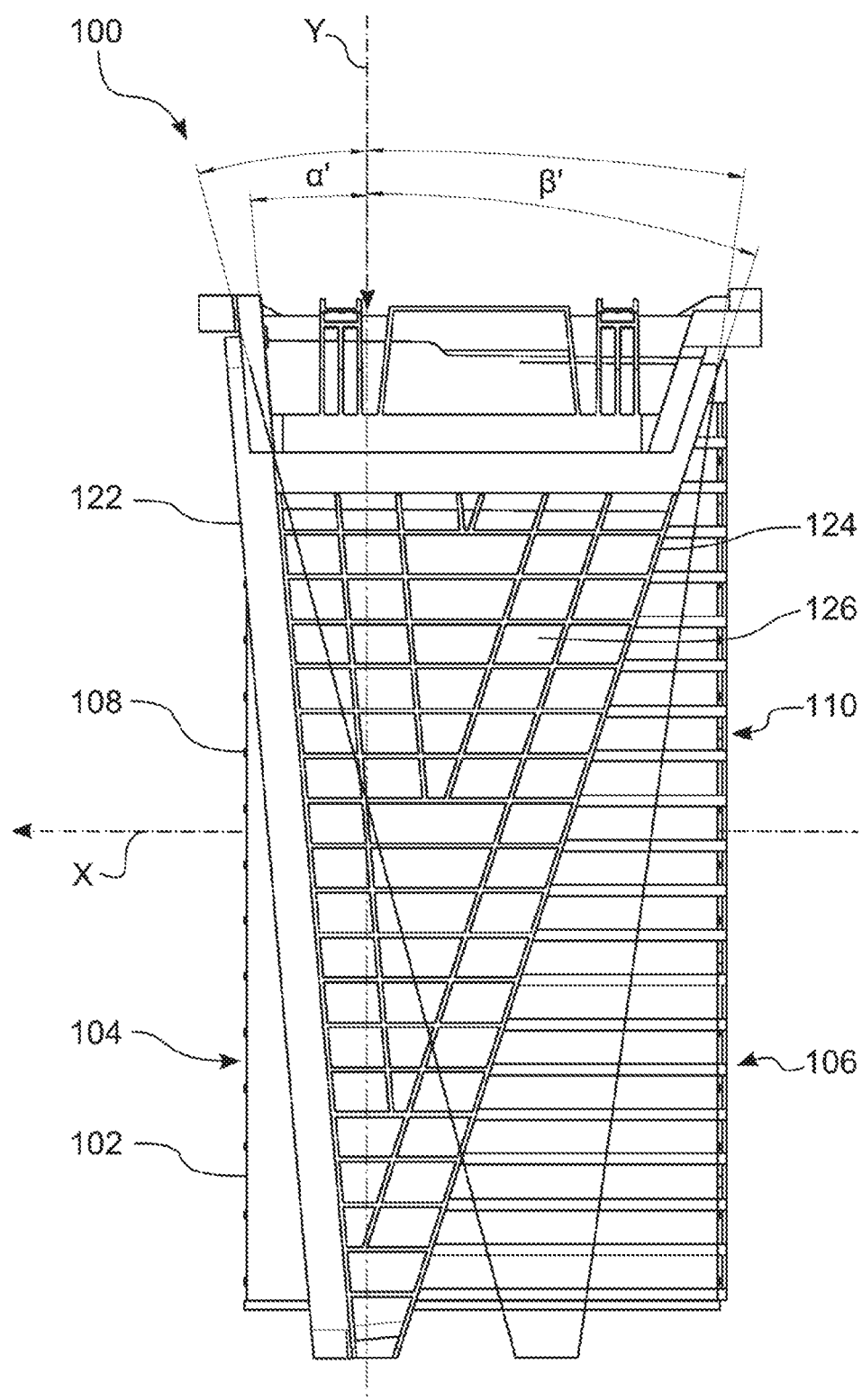
FIG. 6 is a lateral illustration of a filter element according to the invention with indicated alternative angle configuration.

FIGS. 4 to 6 show a filter element 100 according to the invention. The filter element 100 is insertable along the insertion direction Y into a filter 10, as it is illustrated, for example, in FIGS. 1 to 3. The filter element 100 comprises an inflow surface 110, an outflow surface 108 as well as a filter body 102 embodied as a folded bellows. The folding of the filter bellows medium is substantially zigzag-shaped. Preferably, the fold edges extend along or transverse to the insertion direction Y. A first part of the fold edges forms the inflow surface 110, a second part positioned opposite the first part of the fold edges forms the outflow surface 108 of the filter element 100. By sealing the end faces of the fold edges a leakage flow of the fluid to be filtered is prevented.

Alternatively, the filter body 102 can be formed as a layered configuration of a corrugated layer and a flat layer of the filter medium. The thus formed filter channels are preferably arranged in the main flow direction X. Each filter channel is closed off at one of its two end faces; at each end face the filter channels ending thereat are alternatingly closed or open. This structure is referred to occasionally also as Z filter.

The filter body 102 comprises a carrying structure 116 which imparts additional mechanical stability to the filter element 100. A support structure 126, 127 on both sides is integrated into the carrying structure 116. The carrying structure 116 can preferably surround the filter body 102 and is preferably connected indivisibly to the filter body 102 or the filter element 100. The support structure 126, 127 comprises a sealing surface 122 and a support edge 124 which is part of the support structure 126, 127. Sealing surface 122 and support edge 124 are arranged in a V-shape. The angle between the insertion direction Y and the sealing surface 122 is identified by α, the angle between support edge 124 and insertion direction Y is identified by β. The sealing surface 122 in the present embodiment is part of the seal 123. The seal 123 surrounds the filter element 100 and seals the filter element 100 relative to the filter housing 12. In this way, a clean side 104 and a raw side 106 are provided for the filter element 100. Sealing surface 122 and support edge 124 form an acute angle α+β wherein the tip of the angle is located in the direction of the insertion direction Y. In the present embodiment, the angle is 23° and results from the sum of the angles α and β. In the present embodiment, α is selected to be 5°, β is approximately 18°. Of course, also other combinations are conceivable, for example, α=0.5° and β=22.5°.

As is apparent from FIGS. 4 and 5, a part of the clean-side outflow surface of the filter body 102 is located on the clean side 104 of the filter element and thus in main flow direction downstream of the sealing surface 122. The support edge 124 and the sealing surface 122 are located outside of the area of the filter medium 102 that is flowed through by a fluid. The support structure 126, 127 which is formed by support edge 124 and sealing surface 122 is arranged on the filter element 100 on both sides of the main flow direction X. In the installed state the support edge 124 is resting against the guiding surface 24 of the filter housing 12; the sealing surface 122 with the seal 123 is resting against the housing sealing surface 22. During such an insertion process, the seal 123 is compressed and glides along the housing sealing surface 22. This is illustrated in the cutaway illustration A of FIG. 2 in two exemplary positions. Due to the compression of the seal 123, the force $F_D$ is exerted on the seal 123 and causes friction and deformation on the seal 123.

FIG. 6 shows schematically an alternative angle constellation in which the angle α' is selected to be greater and the angle β' is selected to be smaller.

Figure 7:
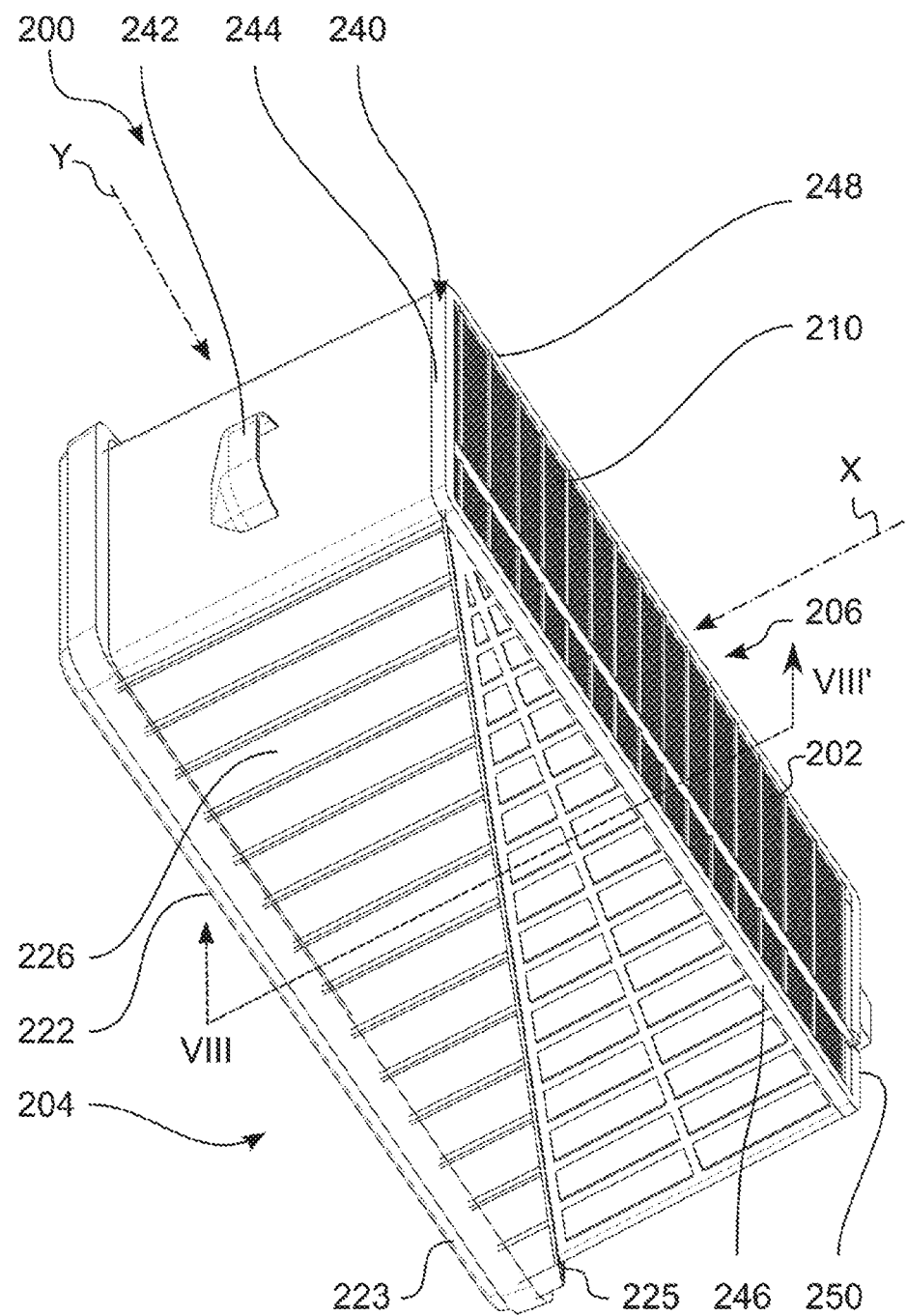
FIG. 7 is a perspective illustration of an alternative embodiment of a filter element according to the invention.
Figure 8:
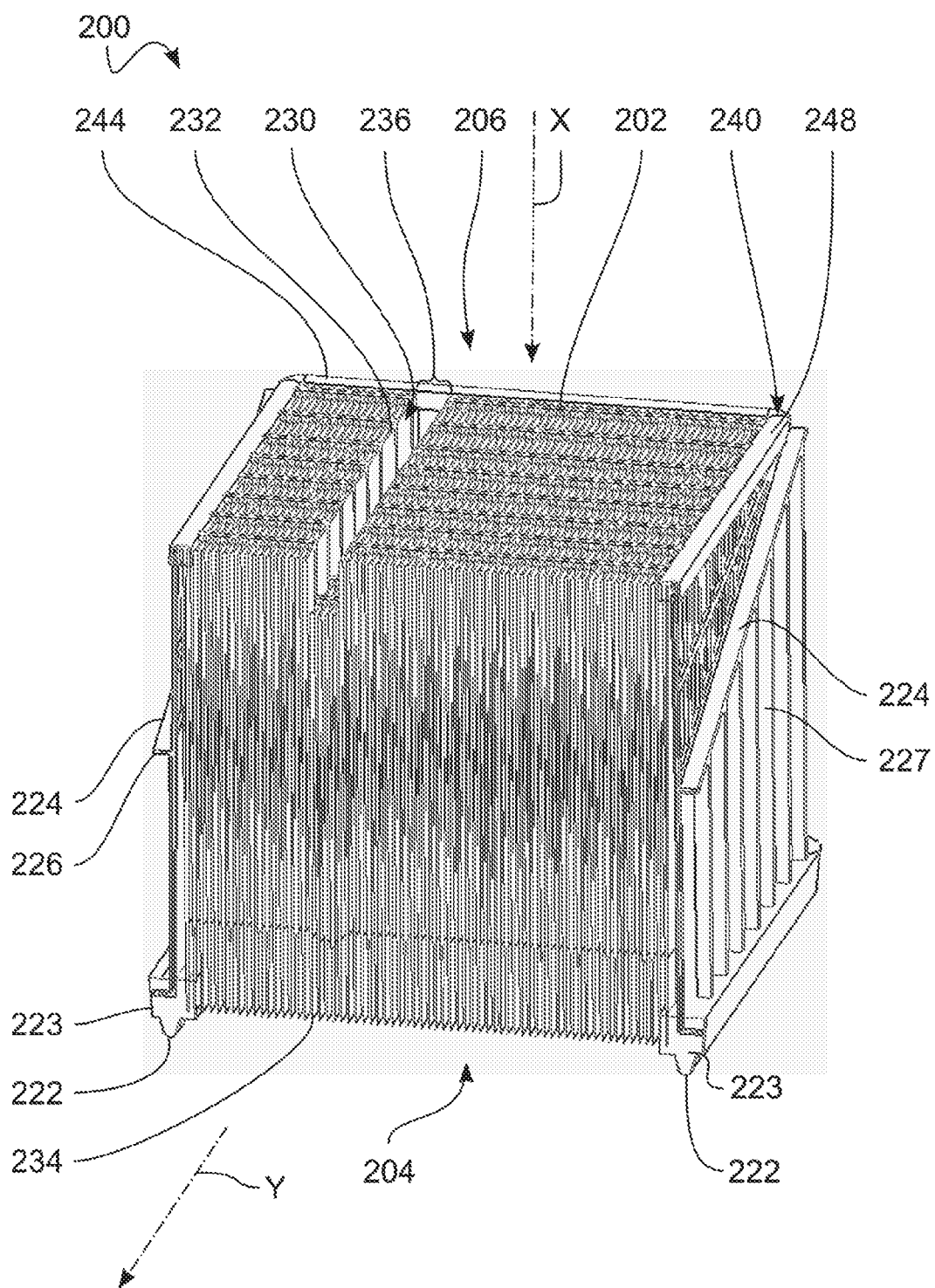
FIG. 8 is a section illustration along the plane VIII-VIII in FIG. 7.
Figure 9:
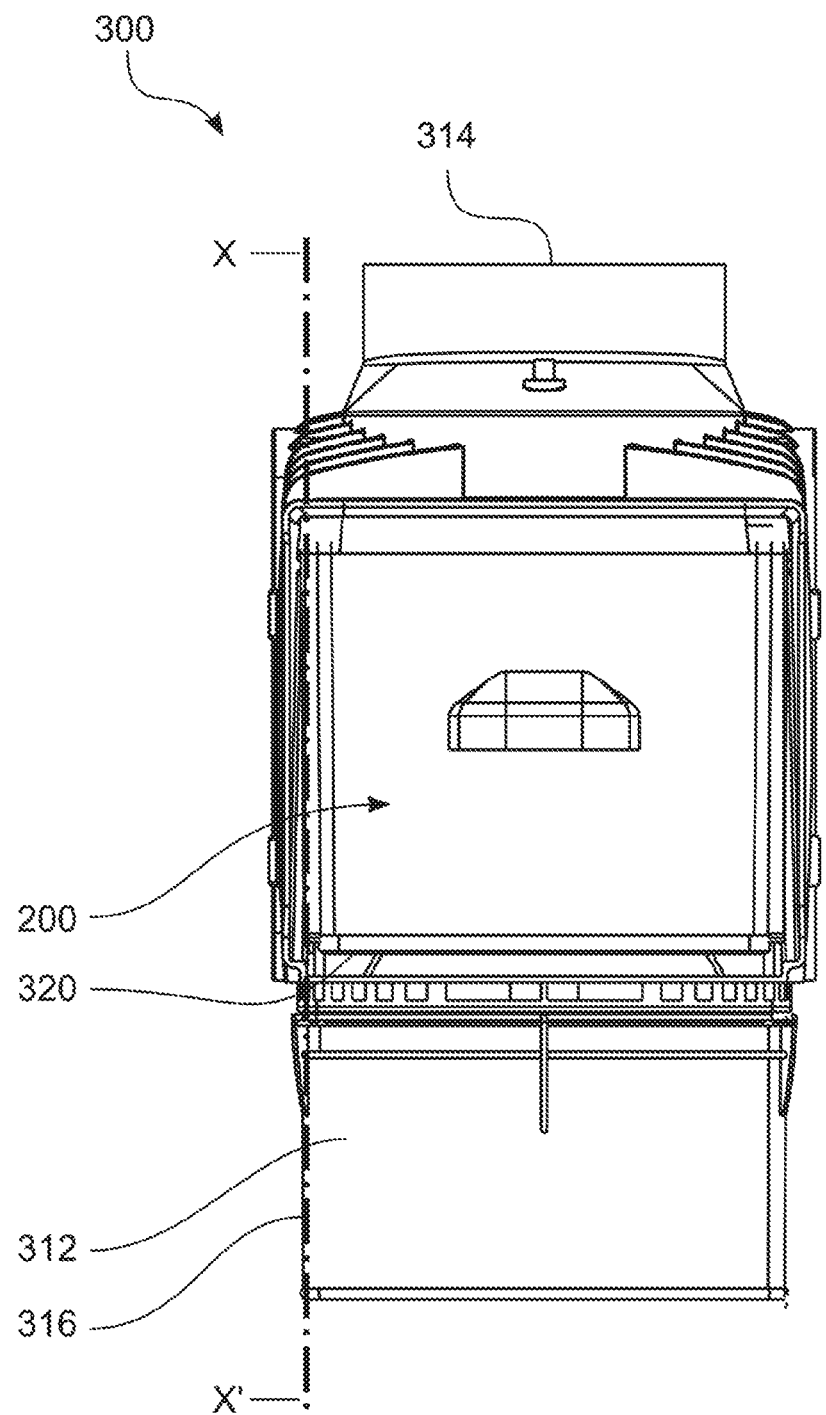
FIG. 9 is a plan view of an alternative embodiment of a filter according to the invention.

In FIGS. 7 and 8, an alternative embodiment of a filter element 200 according to the invention is illustrated. In contrast to the embodiments of FIGS. 4 and 5 or 6, in the embodiment of FIGS. 7 and 8 the angle between the sealing surface 222 and the filter housing 12 has been selected to be very small. In the present embodiment of the filter element 200, the angle α=0.5°. Accordingly, the angle β between the support edge 224 of the support structure 226, 227 and the filter housing is 23°. In FIG. 8, a cross-sectional view along the plane VIII-VIII' of FIG. 7 is illustrated. The extension of the fold edges of the filter body 202 can be seen well in the section illustration of FIG. 8. The folds 230 extend substantially parallel to the insertion direction Y. A fold edge 232 of the fold 230 is located at the raw side 206 of the filter element 200, the opposite fold edge 234 is located at the clean side 204 of the filter element 200.

In an area 236 which is extending transverse to the insertion direction Y across a portion of the raw side 206 and along the entire length in the insertion direction Y, several folds 230 are provided with reduced height so that a recess parallel to the insertion direction Y results at the raw side 206 of the filter element 200. In case of vibrations, this recess in the area 236 enables an additional fixation of the filter element 200 in that a housing-associated web engages this area 236.

The filter body 202 is reinforced at the raw side 206 circumferentially by castable material such as polyurethane. This reinforcement 240 extends circumferentially on the raw-side inflow surface 210 of the filter element 200. In particular, the reinforcement 240 encases the raw-side upper transverse edge 244 and the two raw-side longitudinal edges 246, 248 partially or completely. In this context, the support structure 226, 227 is in particular also fixedly connected by means of castable material with the reinforcement 240 and the filter body 202. This reinforces the raw-side inflow surface 210 and provides protection against impacts when handling the filter element 200, for example, during transport or installation. In the manufacture of the impact protection 240, the filter element 200, in particular the filter body 202, is introduced into a prepared shell filled with the material. The material is foamed and cures. During the foaming process, a part of the filter medium of the filter body 202 is penetrated so that a fixed connection between the impact protection 240 and the filter body 202 is produced.

In a similar way, the oppositely positioned seal 223 in main flow direction X is produced. The shape of the shell determines the shape of the sealing surface 222 of the seal 223. In this context, the support structure 226, 227 is in particular also fixedly connected with the seal 223 and the filter body 202 by means of the seal material.

As can be seen in FIG. 7, the support surface 224 is not only formed laterally adjacent to the filter body 202 but also below the filter body 202. This part 225 of the support surface 224 below the filter body 202 also exerts a force on the seal 223 or the sealing surface 222 in the installed position of the filter element 200. At the top side of the filter element 202, a grip 242 is provided which facilitates removal of the filter element 200 from a filter housing. In particular, in the embodiment of FIGS. 7 and 8 no fastening or clamping elements are provided at the aforementioned top side of the filter element 200. In this embodiment, they are provided on the filter housing, for example, on a cover of a filter housing.

FIGS. 9 through 12 show an alternative embodiment of a filter 300 according to the invention. The filter 300 is suitable for receiving the filter element 200, i.e., it has a corresponding angle configuration for the angles α and β. The filter 300 has in accordance with the filter 10 of FIGS. 1 to 3 a filter housing 312. The filter housing 312 is flowed through along a flow direction X. The filter element 200 is inserted along an insertion direction Y through an insertion opening 320 into the filter housing 312. The filter housing 312 comprises an outflow opening 314 as well as an inflow opening 315. At the inflow side, the filter housing 312 is provided with a cyclone block 316 as a preseparation or coarse separation module with a coarse separation opening 318. The coarse separation opening 318, as shown in FIGS. 9 through 12, can here also be oriented downward in the insertion direction Y. Alternatively, the coarse separation opening 318 can also be arranged laterally on the filter 300.

The fluid which is flowing via the inflow opening 315 and the cyclone block 316 into the filter element 200 flows through the filter element 200 and exits the filter housing 312 through the outflow opening 314. In order to achieve a sealing action of the clean side of the filter 300 relative to the raw side, the filter element 200 is sealed relative to the filter housing 312. The filter element 200 has a circumferential seal 223. The seal 223 extends circumferentially about the filter element 200 and is positioned in a plane which is slanted by an angle α relative to the insertion direction Y or by an angle of 90°−α relative to the main flow direction. In FIGS. 9 through 12, the sealing plane is substantially perpendicular to the drawing plane. A sealing surface 222 of the seal 223 is pressed against the filter housing 312, in particular against the housing sealing surface 322. The housing sealing surface 322 is positioned at an angle of 90°−α relative to the main flow direction X. In order to apply this force, the filter element 200 has a support surface 224. The support surface 224 is positioned relative to the main flow direction X at an angle of 90°−β. The support surface 224 extends from the insertion opening 320 to a position close to the base of the filter housing 312 and contacts in the inserted state of the filter element 200 a guiding surface 324 of the filter housing 312. In particular, the guiding surface 324 extends below the flow-through area of the filter element 200 and forms thus a U-shaped course.

Figure 10:
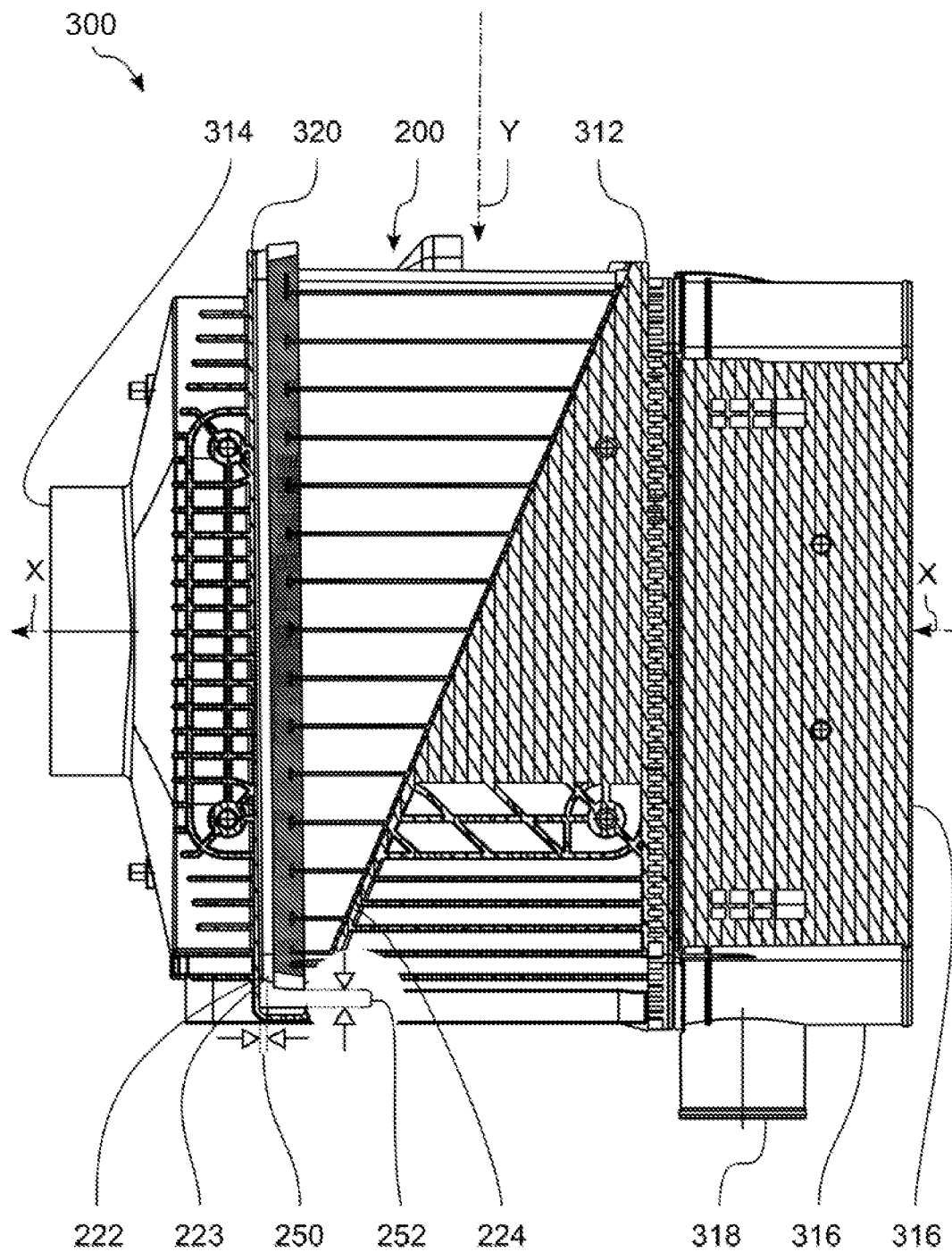
FIG. 10 is a section illustration of the filter of FIG. 9 along the plane X-X with inserted filter element in a first position.

The view of FIG. 10 represents a section through the filter 300 along the plane X-X' and shows the filter element 200 in the position which it assumes when the sealing surface 222 of the filter element 200 during the insertion process presently contacts the housing sealing surface 322. The section view of FIG. 11 extends also along the plane X-X'. Here, the filter element 200 is shown in its final position in which the seal 223 is pressed against the housing sealing surface 322. Between the position of FIG. 10 and the position of FIG. 11, due to the compression of the seal 223, the sealing surface 222 has been moved in the direction toward the support structure 226, 227 opposite to the main flow direction X by an amount h. This compression travel h is identified in the Figs. by reference character 250.

In accordance with the compression travel 250, the sealing surface 222 glides by the distance r along the housing sealing surface 322. The gliding distance r is identified in FIG. 10 by reference character 252. For improved illustration, at this location a portion of the drawing of FIG. 10 has been omitted.

Figure 11:
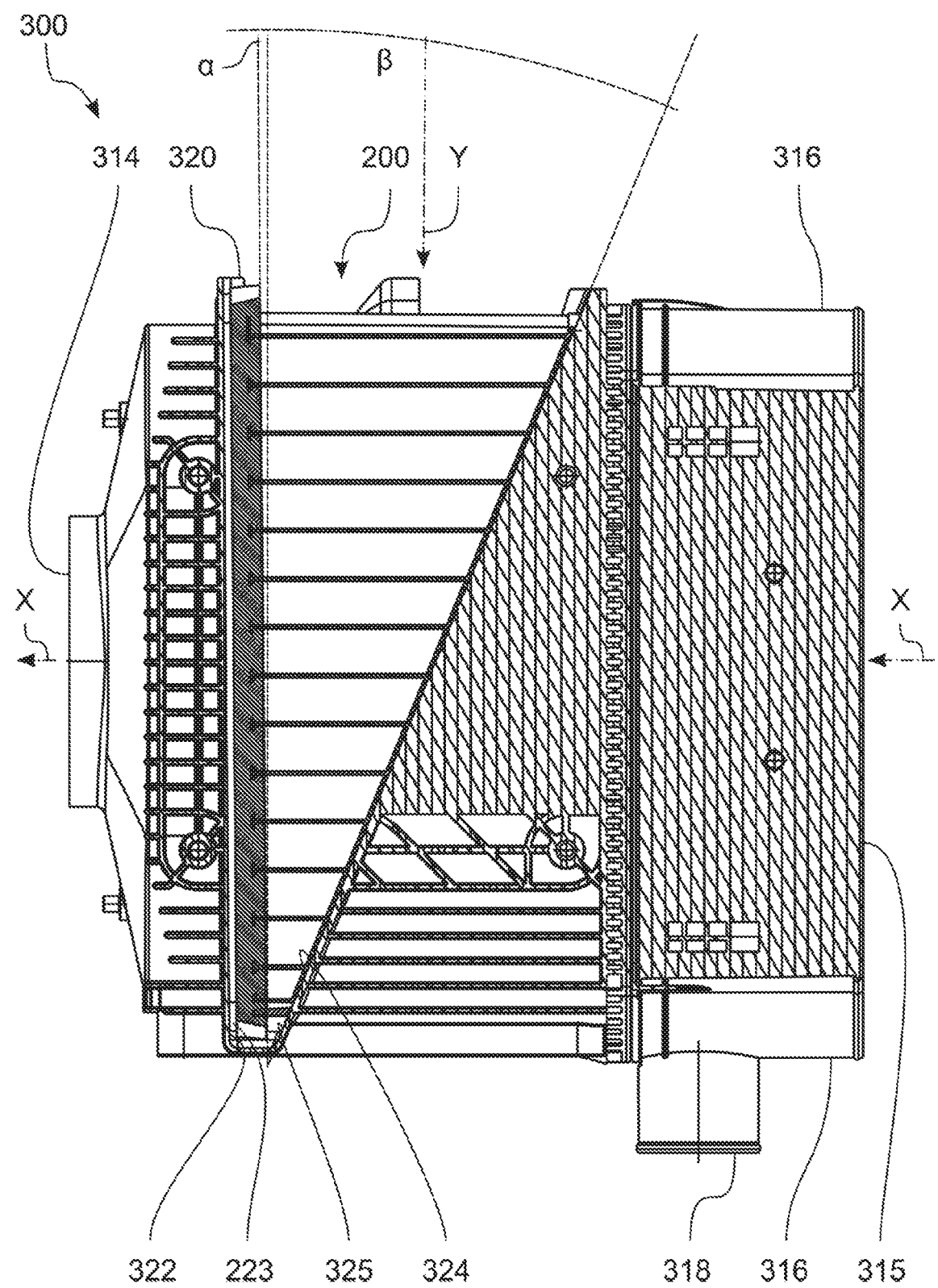
FIG. 11 is a section illustration of the filter of FIG. 9 along the plane X-X with an inserted filter element in a second position.

In the drawing of FIG. 11, the end position of the filter element 200 is reached. The sealing surface 222 has moved closer to the support structure 226 by the compression travel 250 and has moved by the gliding distance 252 along the housing sealing surface 322. In FIG. 11, it can also be seen well that the filter element 200 at the lower side has a third support surface 225. The latter is positioned on the transversely extending part of the housing support surface 325 extending in the lower area of the filter housing 312 and is supported thereat. Accordingly, in particular in the lower area of the filter housing 312 which is far removed from the insertion opening 320, a pressing force of sufficient magnitude acting on the sealing surface 222 is generated also.

Figure 12:
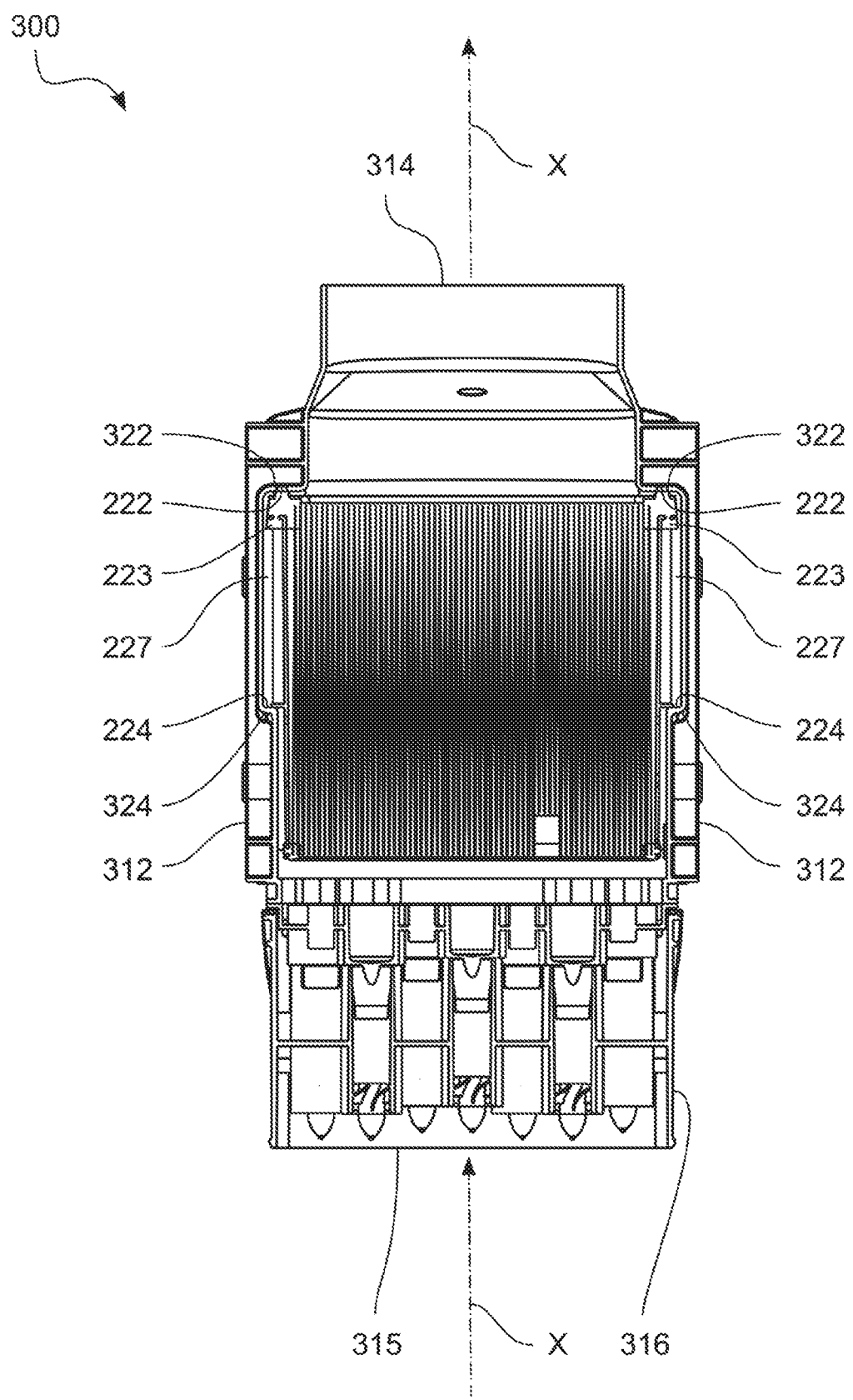
FIG. 12 is a section illustration of the filter of FIG. 9 along a plane perpendicular to the insertion direction.

In the cross-sectional view of FIG. 12, it can be seen well how the force which is exerted in FIG. 12 perpendicular to the drawing plane is transmitted to the filter element 200 through the support edge or support surface 224 of the support structures 226, 227 on the sealing surface 222 of the seal 223. It can also be seen well how the seal 223 is integrated into the support structure 226, 227 and the filter body 202. The same holds true for the reinforcement 240 which is also partially penetrating the filter body 202.

The cross-sectional view of FIG. 12 also shows well the course of the folds of the filter body 202. As already explained, in this embodiment the fold edges of the filter element 200 extend parallel to the insertion direction Y. An alternative embodiment would result when the fold edges extend perpendicular to the insertion direction Y and extend also perpendicular to the main flow direction X.

The present invention takes into account that by a suitable selection of the geometry, by means of which a force is applied to the seal 123, an optimum between the required pressing force $F_D$ on the seal 123 and the simultaneously occurring shearing load due to the movement of the filter element 100 in the installation direction Y, with the seal 123 already contacting the sealing surface 22 during the insertion process, can be obtained. Surprisingly, this can be limited to an angle range of 20°-30° for the opening angle α+β for a plurality of parameter ranges.

While specific embodiments of the invention have been shown and described in detail to illustrate the inventive principles, it will be understood that the invention may be embodied otherwise without departing from such principles.

What is claimed is:

1. A filter element for a filter for filtration of a fluid, wherein the filter element is configured to be insertable along an insertion direction into the filter, the filter element comprising:
   a filter medium configured to be flowed through along a main flow direction;
   wherein the filter medium has two flow surfaces:
      an inflow surface of the filter medium arranged at a raw side of the filter element; and
      an outflow surface of the filter medium arranged at a clean side of the filter element;
   wherein an axial direction (X), as used herein, is a direction from the inflow surface to the outflow surface and is perpendicular to the inflow surface;
   wherein radial is a direction transverse to the axial direction;
   a support structure arranged at a radially outer side of the filter medium between the inflow surface and the outflow surface, the support structure having:
      a support edge arranged on a first axial side of the support structure and positioned between the inflow surface and the outflow surface;
      a seal support surface arranged on an opposite second axial side of the support structure, the seal support surface arranged proximate to and surrounding a first one of the of the two flow surfaces;
   a seal arranged on the seal support surface, the seal circumferentially surrounding the first flow surface of the two flow surfaces of the filter medium,
   wherein the seal has a circumferential sealing surface facing axially outwardly away from the support structure and the filter medium, the circumferential sealing surface configured to seal against a filter housing of the filter when the filter element is in an installed state in the filter housing, separating the clean side from the raw side;
   wherein the circumferential sealing surface is arranged at a first acute angle relative to an axially opposite second flow surface of the filter medium;
   wherein at least a portion of the support edge is positioned at second acute angle relative to the circumferential sealing surface.

2. The filter element according to claim 1, wherein the second acute angle is greater or equal to 20° and smaller or equal to 30°.

3. The filter element according to claim 2, wherein the second acute angle is 22°±2°.

4. The filter element according to claim 1, wherein the support edge is arranged laterally outside of a flow-through area of the filter element.

5. The filter element according to claim 1, wherein the outflow surface, viewed on in the main flow direction, is arranged at least partially downstream of the sealing surface.

6. The filter element according to claim 1, wherein the support structure has an elongate extension in the insertion direction.

7. The filter element according to claim 6, wherein
the support structure extends in the insertion direction from a first radial side of the filter element to a second radial side of the filter element;
wherein the support structure forms a V-shape or tapers in the insertion direction towards a blunt tip arranged proximate to the second radial side of the filter element.

8. The filter element according to claim 1, wherein
when projecting the support edge in the insertion direction onto the circumferential sealing surface, a resulting projection of the support edge is located on the circumferential sealing surface.

9. The filter element according to claim 1, wherein,
when projecting the support edge in the main flow direction onto the circumferential sealing surface, a resulting projection of the support edge is located on the circumferential sealing surface.

10. The filter element according to claim 1, wherein
the circumferential sealing surface is positioned in a plane.

11. The filter element according to claim 1, wherein
the filter medium is a folded filter medium.

12. The filter element according to claim 1, wherein
the filter medium is parallelepipedal.

13. The filter element according to claim 1, wherein
the filter element weighs more than 2.0 kg in an unloaded state or weighs more than 4.0 kg in a loaded state.

14. A filter for filtration of a fluid, the filter comprising:
a filter element according to claim 1;
a filter housing configured to receive the filter element along the insertion direction;
wherein the filter housing is configured to be flowed through along the main flow direction;
wherein the filter housing comprises a clean side, a raw side, and a housing sealing surface, wherein the housing sealing surface, when interacting with a filter element in an installed state of the filter element in the filter housing, separates the clean side from the raw side;
wherein the housing sealing surface is arranged at the first acute angle relative to the insertion direction;
wherein the filter housing comprises a guiding surface exerting a force on at least a portion of the support edge of the support structure of the filter element in the main flow direction by interacting with the filter element when the filter element is in the installed state in the filter housing; and
wherein the housing sealing surface and the portion of the support edge of the support structure are positioned at an acute angle relative to each other.

* * * * *